Dec. 11, 1934.  T. MARTIN  1,983,984
AUTOMOBILE PIT
Filed Jan. 19, 1927  3 Sheets-Sheet 1

Inventor
Thomas Martin
By Philip A. H. Ferrell
Attorney

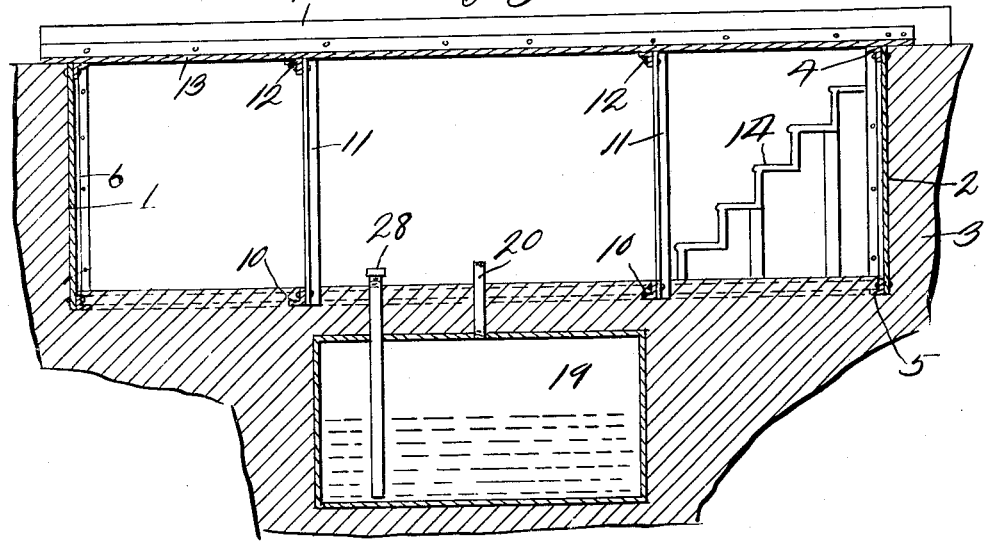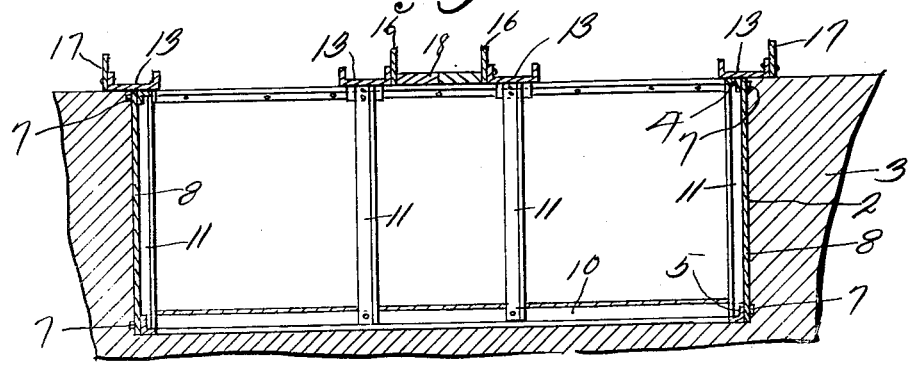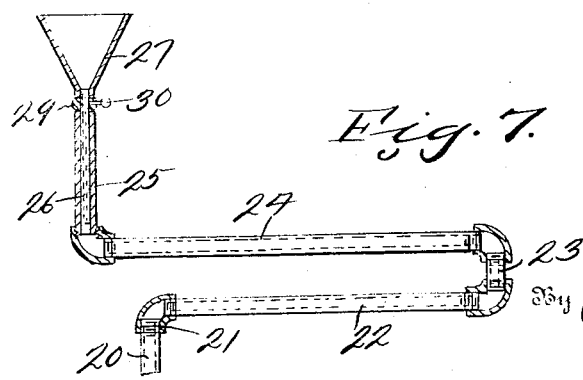

Dec. 11, 1934. T. MARTIN 1,983,984
AUTOMOBILE PIT
Filed Jan. 19, 1927 3 Sheets-Sheet 3
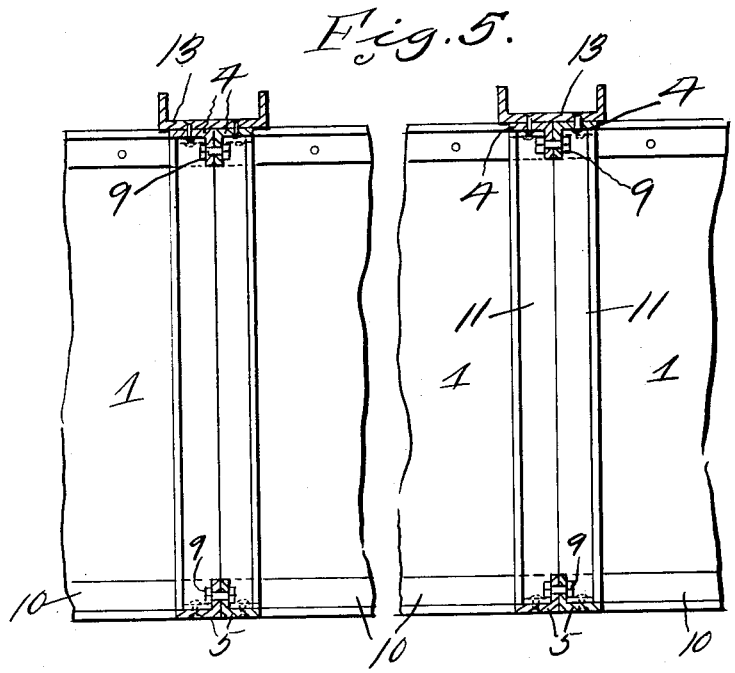
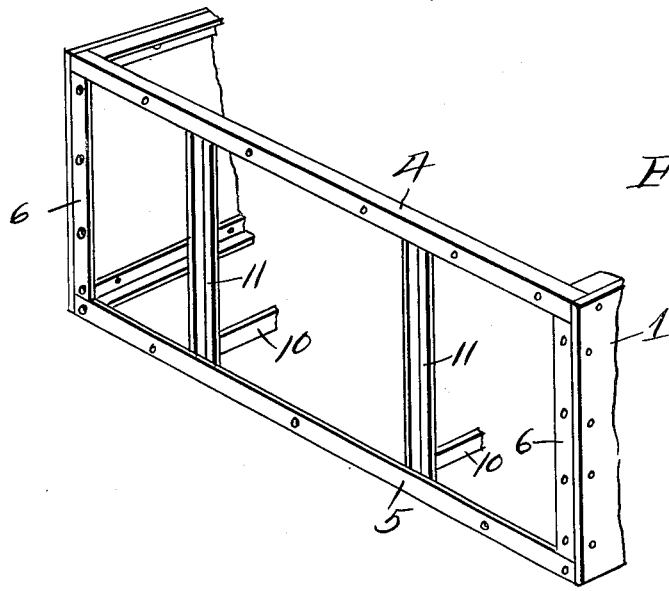
Inventor
Thomas Martin
By Philip A. H. Ferrell
Attorney Patented Dec. 11, 1934

1,983,984

UNITED STATES PATENT OFFICE 1,983,984

AUTOMOBILE PIT

Thomas Martin, New York, N. Y.

Application January 19, 1927, Serial No. 162,699

2 Claims. (Cl. 184—1.5)

The invention relates to automobile pits, and has for its object to provide a device of this character formed from a casing imbedded in the ground and trackways extending across said casing, and means carried by opposite sides of said casing whereby similarly constructed casings may be attached thereto for adding additional pits, thereby allowing additional units to be added as desired.

A further object is to provide an automobile pit casing having trackways extending across the same, which casing may be removed and transported to another location if desired, thereby obviating the loss of money now entailed where concrete pits are used, and which concrete pits can not be transported from place to place.

A further object is to provide an automobile pit casing without a bottom whereby oils and greases will, when coming in contact with the bottom of the pit which is earth or cinders, soak into the ground, and an operator in the pit will not slip as is the common difficulty with pits having concrete bottoms.

A further object is to provide the casing, adjacent its lower end, with transversely disposed brace bars for preventing collapsing incident to earth pressure and uprights extending upwardly from the brace bars for supporting the trackways which extend across the upper side of the casing.

A further object is to provide the opposite sides of the casing with removable plates whereby additional casing sections may be attached thereto, and trackways positioned over the opposite sides of the casing for overlying adjacent casing sections when placed in position.

A further object is to form the trackways from channel members and upwardly extending U-shaped flanges at the forward side of the casing and connecting the adjacent flanges of adjacent trackways and forming means for preventing automobiles from running into the pit.

A further object is to provide a waste tank, preferably beneath the pit, and an adjustable drain member within the pit and provided with means whereby said drain member may be positioned between the trackways carried by the casing as desired.

A further object is to provide an automobile pit having a plurality of trackways extending across the same with a drain tank having a drainage device which drainage device may be shifted to various positions between either or both of the trackways as desired.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:

Figure 3 is a vertical longitudinal sectional view through the pit casing and pit taken on line 3—3 of Figure 1.

Figure 4 is a vertical transverse sectional view taken on line 4—4 of Figure 1.

Figure 5 is an enlarged vertical transverse sectional view through adjacent pit casings, showing the connections therebetween.

Figure 6 is a perspective view of one side of one of the pit casings with the plate removed.

Figure 7 is an enlarged view in elevation of the drainage pipe, parts being shown in section to better illustrate the same.

Figure 1:
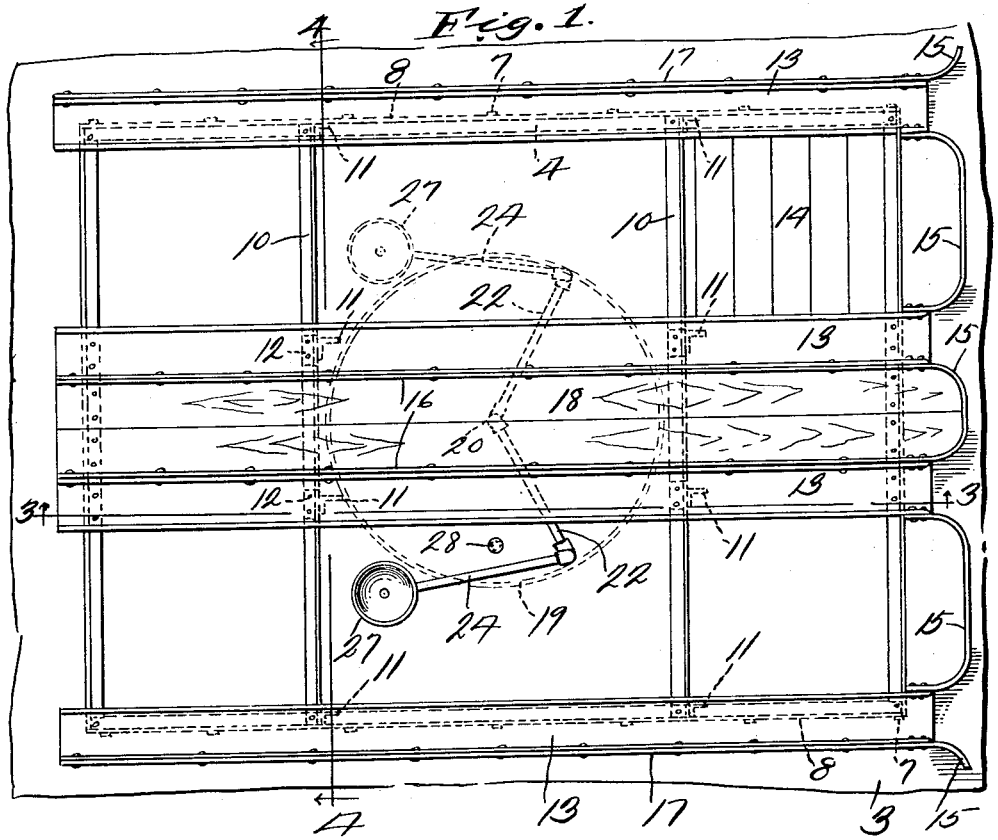
Figure 1 is a top plan view of one of the pits.

Referring to the drawings, the numeral 1 designates the pit casing which is preferably formed from sheet metal, and which casing is rectangular shaped, and is not provided with a bottom, so when it is imbedded in a pit 2 in the ground 3, oil and grease will soak into the ground, thereby obviating one of the common difficulties experienced in cement pits as at present constructed. Each casing 1 at its upper and lower side is provided with rectangular shaped reinforcing frames 4 and 5, which frames are connected together at the corners of the casing by means of bars 6. Removably secured by means of bolts 7 to the sides of the casings are plates 8, which are adapted to be removed when it is desired to add additional pit sections as clearly shown in Figure 5, and at which time the sides of the frames 4 and 5 are connected together by means of bolts 9 as clearly shown in Figure 5, therefore it will be seen that as the business of a service station increases, it will only be necessary for the owner to add sections to his pits. By forming the casings from sheet metal and from sections detachably connected, it is obvious that if the owner abandons a particular station the pit may be divided into its sections, removed from the ground and transported to a new location, which is not possible with pits as at present constructed of concrete, which can not be transported, and must be destroyed or left, which is a material loss to the operator, when it is considered that in some service stations there are as many as twenty or thirty of these pits, for instance those serving taxicab companies. The lower rectangular shaped frame 5 is provided with transversely disposed brace bars 10, which brace the casing section transversely and prevent collapse incident to pressure of dirt on the sides thereof. Brace bars 10 have connected thereto upwardly extending standards 11, which standards are connected by means of angle members 12 to the undersides of the channeled track members 13, which extend across the upper side of each casing. Each casing is provided with two pairs of trackways 13 for receiving two machines at the same time, and at the same time the operator will have access to the undersides of both machines without leaving the pit, and where a plurality of units are connected together will have unobstructed access through the entire pit, which is not only desirable for eliminating the necessity of the operator coming out of the pit to go to another pit, but allows the operator to easily escape from the pit in case of fire, as it will only be necessary for the operator to go into the adjacent casing and leave the pit by way of the steps 14.

Figure 2:
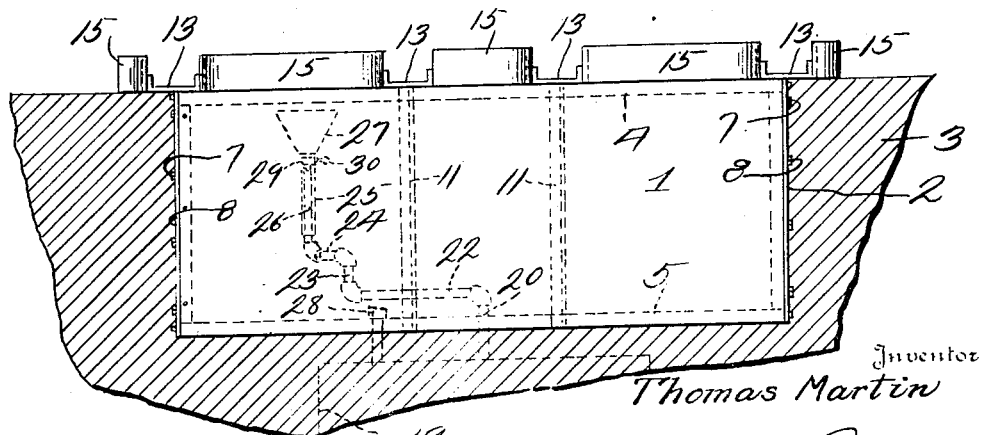
Figure 2 is a front elevation of one of the pit casings.

It will be noted that the trackways at the side of each casing extend beyond the sides thereof substantially for half their width, therefore it will be seen that when an adjacent section is desired, it will only be necessary to extend the side of the adjacent section under the trackways 13 referred to, and secure them in place by means of the bolts 9 as clearly shown in Figure 5, and after which the deflecting flanges may be connected. The adjacent flanges of the adjacent trackways 13 are connected together by U-shaped upwardly extending flanges 15 as clearly shown in Figures 1 and 2 and which flanges are sufficiently high to prevent an automobile from going over the same, consequently danger of an automobile running into the pit is obviated. The U-shaped member centrally of each casing is provided with arms 16, which extend entirely across the casing, thereby obviating any danger of lateral movement of the automobile on either of the trackways in one direction, and the outer flanges of the outer trackways are provided with similarly constructed flanges 17 for the same purpose. A removable platform 18 is provided between the flanges 16 and onto which platform or walkway, the operator of the automobile may have access to the machine or may use the same when leaving the machine. Imbedded in the ground, preferably below the pit and casing is a waste oil tank 19 from which a pipe 20 extends upwardly substantially centrally of the chamber of the casing, and pivotally connected on the threaded upper end 21 of pipe 20 is a horizontally disposed arm 22 having pivotally connected thereto by the union 23 a second horizontally disposed pipe 24, which pipe 24 terminates in a vertically disposed pipe 25 in which is slidably mounted and vertically movable the tube 26 carried by a funnel 27. By providing the pivoted pipe sections 22 and 24 it will be seen that the funnel 27 may be positioned beneath either of the trackways as desired and where there are automobiles on both trackways, the operator may drain one machine while working on the other. It will also be noted that by providing the arms 22 and 24, the funnel may be placed in various positions beneath an automobile on either trackway, consequently the device may be easily and quickly adjusted to a position where oil and grease drained from the machine will pass through the piping to the tank 19, from which it may be removed through a discharge pipe 28, for instance by pumping, however a gravity drain may be utilized if desired. The tubular member 26 has slidably mounted thereon a collar 29, which is provided with a set screw 30, and by loosening said set screw 30, it is obvious the operator can easily and quickly move the funnel 27 upwardly between either trackway 13 to a position adjacent the engine of an automobile or any other part thereof, thereby obviating splashing of grease or oil drained from the machine. After the adjusting operation the set screw 30 is tightened, thereby preventing downward movement of the tube 26, and causing the collar 29 to hold the tube and the funnel against downward movement by engagement with the upper end of the pipe section 25.

From the above it will be seen that a service station pipe casing is provided which may be easily and quickly removed from the ground and transported to another location and that said casing is provided with means whereby additional casing sections may be added to opposite sides thereof as desired.

The invention having been set forth what is claimed as new and useful is:—

1. A multiple automobile pit comprising a single common chamber, a plurality of spaced trackways overlying a plurality of individual servicing positions in said common chamber and bumper means at the front end of said trackways for guiding the wheels of automobiles thereto.

2. A multiple automobile pit comprising a single common chamber, a plurality of spaced trackways overlying a plurality of individual servicing positions in said chamber, a plurality of walkways interposed between the said trackways and bumper means between the individual tracks of each trackway and between adjacent trackways.

THOMAS MARTIN.